No. 686,845. Patented Nov. 19, 1901.
A. T. FISCHER.
WEEDING AND THINNING HOE.
(Application filed Jan. 2, 1901.)
(No Model.)
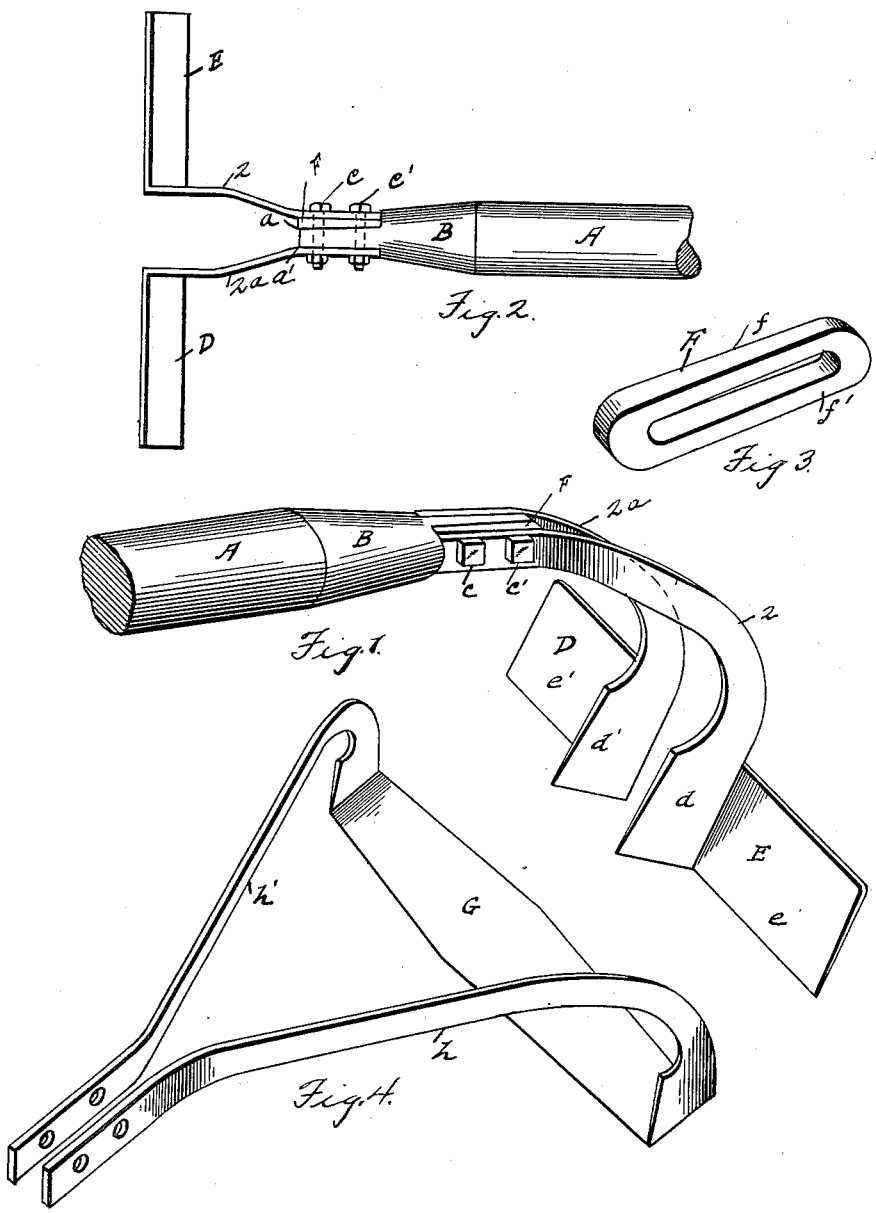

UNITED STATES PATENT OFFICE.

ALEXANDER T. FISCHER, OF DETROIT, MICHIGAN.

WEEDING AND THINNING HOE.

SPECIFICATION forming part of Letters Patent No. 686,845, dated November 19, 1901.

Application filed January 2, 1901. Serial No. 41,798. (No model.)

*To all whom it may concern:*

Be it known that I, ALEXANDER T. FISCHER, a citizen of the United States, residing at Detroit, county of Wayne, State of Michigan, have invented a certain new and useful Improvement in Weeding and Thinning Hoes; and I declare the following to be a full, clear, and exact description of the invention, such as will enable others skilled in the art to which it pertains to make and use the same, reference being had to the accompanying drawings, which form a part of this specification.

This invention relates to a weeding and thinning hoe, and has for its object an improved agricultural implement and a handle therefor to be employed for cutting, stirring the ground, and thinning plants.

In the drawings, Figure 1 is a perspective of a thinning-hoe, showing its connection to the end of the handle. Fig. 2 is a plan view of the same. Fig. 3 is an adjusting-block. Fig. 4 shows a weeder adapted to be employed with the same handle as that used with Fig. 1.

The handle A is inserted in a ferrule B, the front end of which terminates with a flattened tang-seat, both sides of the ferrule being flattened at $a$ and $a'$, and the portion of the ferrule between the flattened sides is provided with bolt-holes for the passage of holding-bolts $c$ and $c'$.

The thinning-hoe is made in two parts D and E, which are alike, except that one is a right-hand and the other a left-hand structure. The right-hand part consists of a cutting-blade $e$, to which there is connected a tang, and the tang is connected to a part $d$ of the blade, bent substantially at right angles to the main part of the cutting-blade. The tang consists of a bent arm 2, one end of which is provided with bolt-holes to engage over the bolts $c$ and $c'$ and which curves to and is made integral with the angled part $d$ of the blade E. The left-hand section D has a cutting-blade $e'$ with an angled part $d'$, from which extends the tang $2^a$. The shape of the cross-section of the tang is immaterial; but that part of it which engages with the ferrule or with the filler-block, hereinafter mentioned, should be made of a shape to fit snugly against the ferrule or the filler. Preferably the engaging faces should be flat; but other forms may be used provided only the engaging faces correspond to make a firm connection.

The two parts of the thinner-hoe are secured to the ferrule, and thereby to the handle A, with a space intervening between the parts $d$ and $d'$, and this space may be varied by inserting a filler-block F between one of the tangs and the flattened face of the ferrule, and filler-blocks of different size may be used to regulate the distance between $d$ and $d'$ as may be desired. I prefer to use a filler-block F with parallel faces $f$ and $f'$ in order that the blades $e$ and $e'$ may remain in alinement and not be set at an angle the one to the other, as would happen if the two tangs were hinged together and spread from the hinge or if the adjustment were made by a wedge-shaped filling-block. It is desirable that the two cutting parts $e$ and $e'$ have their cutting edges in alinement and practically at right angles to the axis of the handle and that whatever adjustment as to the width between the parts $d$ and $d'$ be made the cutting edges remain in alinement.

For merely weeding or stirring purposes the double blades D and E are removed from the handle and a single blade G, with two tangs $h$ and $h'$, is secured to the same handle. The blade G is provided with sharpened or cutting edges on both its front and rear edges and is adapted to be used to cut the weeds and stir the ground with either a push stroke or a draw stroke.

The main object of the thinner-hoe is to cut superfluous growths from the rows of plants, and this is done by the workman walking across the rows of plants rather than along them and striking the superfluous plants at each side of a selected plant, allowing the hoe to pass the selected plant without harming it. The hoe is drawn across the row with one blade E at one side of the selected plant and the other blade D at the other side of the selected plant. The interval between the blades is occupied by the selected plant, which, because of the curvature and the long reach of the tangs 2 and $2^a$, is not injured.

What I claim is—

In a thinning-hoe, the combination of a handle, two symmetrically-arranged blades lying a distance apart in a plane at right angles to said handle, each of which blades has its own tang, said tangs being broad and flat at their outer ends extending in planes parallel to said handle, having their lower edges sharpened and engaging the inner ends of the cutting-blades, said edges forming cutting edges continuous with and at right angles to the cutting edges of said blades, whereby in the assembled tool, there is provision made for drawing the tool over a plant so that said plant shall pass between said blades, the hoe cutting from the surface of the ground downward and then horizontally outward at each side of the plant without injuring the same, substantially as described.

In testimony whereof I sign this specification in the presence of two witnesses.

ALEXANDER T. FISCHER.

Witnesses:
 CHARLES F. BURTON,
 JOHN N. GOODRICH.